United States Patent [19]
Rollet et al.

[11] Patent Number: 5,863,012
[45] Date of Patent: Jan. 26, 1999

[54] CYCLIC STICK SYSTEM GIVING A HELICOPTER SPEED STABILITY

[75] Inventors: Philippe Alain Jean Rollet, Velaux; Paul Gérard Eglin, Aix en Provence, both of France

[73] Assignee: Eurocopter, Marignane Cedex, France

[21] Appl. No.: 759,622

[22] Filed: Dec. 5, 1996

[30] Foreign Application Priority Data

Dec. 5, 1995 [FR] France ................................. 95 14344

[51] Int. Cl.$^6$ ............................. B64C 13/00; B64C 13/08
[52] U.S. Cl. ........................ 244/17.13; 244/178; 244/223
[58] Field of Search ............................... 244/17.13, 178, 244/194, 195, 223, 234, 236

[56] References Cited

U.S. PATENT DOCUMENTS

| | | | |
|---|---|---|---|
| 3,733,039 | 5/1973 | O'Conner et al. | 244/17.13 |
| 4,168,045 | 9/1979 | Wright et al. | 244/17.13 |
| 4,258,890 | 3/1981 | Korkosz | 244/223 |
| 4,477,876 | 10/1984 | Wright et al. | 244/17.13 |
| 4,645,141 | 2/1987 | McElreath | 244/17.13 |
| 4,664,346 | 5/1987 | Koenig | 244/17.13 |
| 4,758,958 | 7/1988 | Von Gersdorff | 244/178 |

FOREIGN PATENT DOCUMENTS 2136603   9/1984   United Kingdom .
2140174   11/1984  United Kingdom .

*Primary Examiner*—S. Joseph Morano
*Attorney, Agent, or Firm*—Stevens, Davis, Miller & Mosher, L.L.P.

[57] ABSTRACT

A cyclic stick system for a helicopter or other aircraft includes memories for holding minimum and maximum speed values, a comparator for comparing an air speed V1 with the minimum and maximum speed values, a router for selecting either the air speed V1 or a quiescent speed, a subtracter for obtaining a difference between the output of the router and a reference speed, another router for selecting between the difference and a signal representing an orientation of the stick, and a switch for selecting times when the air speed V1 is to be stored as the reference speed. On the basis of the air speed V1 and under the control of the device for retrimming said cyclic stick, the system acts on the motorization of stick in order to confer on the helicopter apparent longitudinal static stability in terms of forces on the cyclic stick so that to accelerate (or decelerate) and maintain a new higher (or lower) speed. The force applied to the cyclic stick is always in the direction of pushing (or of pulling) outside of any deliberate retrimming action.

11 Claims, 2 Drawing Sheets

CYCLIC STICK SYSTEM GIVING A HELICOPTER SPEED STABILITY

FIELD OF THE INVENTION

The present invention relates to a cyclic stick system for a helicopter, provided with a retrimming device and providing said helicopter with stability of forward speed relative to the air.

DESCRIPTION OF THE RELATED ART

It is known that in a helicopter, the static position of the flight controls controlling rolling and pitch changes as a function of the flight conditions. If these controls incorporate a spring generating a force gradient, the pilot has to retrim the forces felt on the stick by acting on the devices for retrimming the forces (generally termed "trim release" in aeronautics), each time these flight conditions (speed of forward travel, motive power applied) change. Such trim release cancels out the static control forces which are harmful to pilot comfort and to flying accuracy.

However, the frequent need to retrim the forces on the cyclic stick creates a substantial workload which certain pilots find irksome. Thus, in order to reduce this workload, devices have already been proposed which tend automatically to cancel out the forces after a certain length of time. Such devices are generally of the follow-up type and they slave the position of anchorage of the spring (nil forces reference) to the current position of the stick, with a certain dynamic behavior.

It is also known that on a helicopter, the longitudinal cyclic pitch (pitch control) applied to the blades of the main rotor which provides lift and forward motion increases (in the direction tending to tilt the rotor disk further forward), generally speaking, with the air speed, the rate of rotation and the collective pitch of this rotor moreover being kept constant. This phenomenon is generally known as positive longitudinal static stability. This has two effects which are beneficial to flying.

The first lies in the fact that in equilibrium the longitudinal position of the cyclic stick is representative of the speed of forward travel and is so in a sense which is logical for the pilot: a forward position corresponds to a high steady speed, a backward position to a low steady speed. This also imposes a consistency of action between the short-term commands and long-term commands (equilibrium) for obtaining a variation in speed, because in the short term a demand to increase speed always requires a pitch-down command (tilting the rotor disk forward) and therefore shifting of the stick forward, bearing in mind the intrinsic characteristics of the mechanics of flight.

As far as the second of these beneficial effects is concerned, it consists in the fact that outside of any action from the pilot, following an external disturbance, such as gusts which temporarily alter the speed, this speed tends to return to the value it had before the disturbance. The craft is said to be "speed stable", which is an important safety factor in avoiding inadvertently exceeding the speed limits specified in the flying manual, for example the maximum permissible speed (Vne). The tendency to return to the speed of equilibrium customarily takes place by means of Phugoid oscillations in speed and in altitude. In order to ensure good handling in cruising flight, without an excessive workload for the pilot, it is contrived for these oscillations to converge (positive dynamic stability) or not to diverge too fast (negative dynamic stability) depending on the dynamic stability requirements with which the craft has to comply (military standards, civil regulations, number of pilots in the crew, etc).

Unfortunately, bearing in mind the many other constraints which have an impact on helicopter design, some helicopters have neutral or even negative longitudinal static stability in a certain speed range. In this speed range, the two beneficial effects mentioned above are lost and in general this results in an increase in workload and a heightened need for attentiveness on the part of the pilot.

This is because in this case the position of the cyclic stick in equilibrium moves back as the speed increases, for a constant collective pitch. To change from one steady speed to another, higher, one, without touching the collective pitch lever, the pilot has first of all to push the stick forward (pitch-down command) then to bring it back into a static position further back than the initial position in order to stabilize the speed, and this eliminates the first beneficial effect mentioned above.

Likewise, following an external disturbance and in the absence of a corrective action from the pilot, the helicopter tends to drift further and further away from its steady speed without tending to return (aperiodic divergence), at least until the craft regains a region of positive static stability, if one exists. If this divergence takes place in the direction of an increase in speed, then this may lead to the maximum permissible speed (Vne) being inadvertently exceeded, something which goes against safety and against the second beneficial effect recalled above.

In order to correct such an instability, when it is not possible to achieve this by aerodynamic modification to the helicopter cell, one solution consists in artificially offsetting the position of the cyclic stick as a function of the speed in order to restore positive static stability. This offsetting takes place by using an actuator with slow dynamic behavior slaved to the speed and known as the "Pitch Bias Actuator" or PBA. This actuator is placed in series in the longitudinal pitch-control chain of command between the cyclic stick and the input of the combiner.

The drawback of such a solution is that it increases the complexity of the flight-control system by adding an additional actuator and that it may pose a problem of safety in the event of malfunctioning (example: bottoming) of this actuator, which implies additional monitoring and redundancies in order to ensure safety. In particular, when the authority required for this actuator is relatively high (example: ±15%), bottoming in an extreme position greatly reduces the control authority accessible to the pilot for maneuvering the helicopter.

SUMMARY OF THE INVENTION

As a consequence, the main subject of the present invention is a cyclic stick system which overcomes these drawbacks and which makes it possible to restore correct handling as well as positive speed stability on a helicopter which was initially longitudinally statically unstable or not very stable, and does so without requiring an additional actuator (such as a PBA) to be inserted in the longitudinal-control chain of command.

An object of the present invention is for the cyclic stick system to provide the helicopter with apparent longitudinal static stability in terms of forces on the cyclic stick so that to accelerate (or decelerate) and maintain a new higher (or lower) speed, the force applied to the cyclic stick is always in the direction of pushing (or of pulling) outside of any deliberate retrimming action.

Another object of the present invention is also to provide a cyclic stick system such that following a disturbance in speed by a longitudinal force applied to the stick, the helicopter should return to a speed close to its steady speed when the force on the stick is progressively released.

To this end, according to the invention, the cyclic stick system for a helicopter including means continuously delivering parameters which are representative of the current flight status of said helicopter, at least one of said parameters being representative of the speed V1 of said helicopter with respect to the air (hereafter denoted air speed), and said system including a cyclic stick which can be shifted by a pilot in at least the direction corresponding to pitch-attitude control of said helicopter, is noteworthy in that it includes:

elastic means for returning said cyclic stick for exerting an action which opposes that exerted by said pilot on said cyclic stick in said direction for pitch-attitude control;

motor means capable of shifting a moving member to which said elastic return means are attached, at an attachment point;

trim-release means available to the pilot of the helicopter, allowing the opposing action exerted on said cyclic stick by said elastic means to be cancelled out;

first memory means capable of recording the value Vref of said parameter V1 representative of said air speed at the moments when said pilot actuates said trim-release means; and first routing means, controlled by said trim-release means in order to send to said motor means:
  a control command which is representative of the positions of said cyclic stick for pitch-attitude control at the moments when said pilot actuates said trim-release means; or alternatively
  outside of the moments when the pilot actuates said trim-release means:
    either a nil control command, when the current value of said parameter V1 representative of the air speed is below or equal to a minimum value Vmin above which said helicopter has unsatisfactory static longitudinal stability;
    or a control command which is a function of the difference between said current value of said parameter V1 representative of the air speed and said recorded value Vref, when the current value of said parameter V1 representative of the air speed is above said minimum value Vmin.

Thus, by virtue of the present invention, the system sends to said motor means commands for shifting the neutral point for the forces (point of attachment or of anchorage of the elastic means on said moving member), these commands being formulated mainly as a function of the air speed and acting in such a way that:

aside from any force applied by the pilot (for example him having let go of the stick), the shifting of the anchorage point drives the cyclic stick in such a way that the latter generates speed-stabilizing commands counteracting the tendency to diverge when the longitudinal static stability is unsatisfactory, that is to say when it is negative, neutral, or not positive enough; and upon an action by the pilot on the cyclic stick, the shifting of the anchorage point still generates a pushing (or pulling) force when the air speed increases (or decreases).

Thus positive speed stability is restored or increased, with a control workload which is equivalent, in terms of forces applied, to that obtained with positive stability.

In cases where it is necessary to provide such stabilization in a speed range which is delimited, at the bottom end, by said minimum value Vmin and, at the top end, by a predetermined maximum value Vmax of said parameter V1 representative of the air speed, the cyclic stick system in accordance with the present invention is additionally noteworthy in that outside of the moments when the pilot actuates said trim-release means, said first routing means send to said motor means:

either a nil control command, when the current value of said parameter V1 representative of the air speed is:
  below or equal to said minimum value Vmin; or
  equal to or above said predetermined maximum value Vmax;
or a control command which is a function of said difference between said current value of said parameter V1 and said recorded value Vref when said current value of said parameter V1 representative of the air speed lies between said minimum and maximum values Vmin and Vmax.

In each of the two cases mentioned above (stabilization above a minimum value or in a speed range), said function of the difference between said current value of the parameter V1 and the recorded value Vref may be linear or nonlinear.

As a preference, said first memory means are connected to the means delivering the parameter V1 representative of said air speed by means of switching means which are normally open and are made to close by said trim-release means when they are actuated by the pilot.

Moreover, the cyclic stick system in accordance with the present invention may include:

second memory means in which is recorded said minimum value above which said helicopter has unsatisfactory static longitudinal stability;

comparison means continuously comparing the current value of said parameter V1 representative of said air speed with said minimum speed;

second routing means controlled by said comparison means so as to send to their output either said parameter V1 when the current value of this parameter is above said minimum value, or said value Vref recorded in said first memory means when the current value of said parameter V1 is below or equal to said minimum value; and subtraction means, the inputs of which are respectively connected to the output of said second routing means and to said first memory means and the output of which is connected to one of the inputs of said first routing means.

In cases where the speed stability is provided in a speed range, the cyclic stick system in accordance with the present invention additionally includes third memory means in which is recorded said predetermined maximum value and said comparison means additionally continuously compare the current value of said parameter V1 representative of said air speed with said predetermined maximum speed.

Of course, it is possible for the routing means, the memory means, the comparison means and the subtraction means not to be formed of specific discrete devices, but to consist of parts of a more complicated computation system.

As a preference, in the connection between the subtraction means and said first routing means, use is also made of adjusting means, such as a gain generator making it possible to adjust the tactile sensation felt by the pilot actuating said cyclic stick.

The gain of said gain generator may be constant or alternatively may be a function of one or several of the parameters which are representative of the current flight status of said helicopter.

From what has just been described, it will be readily understood that the cyclic stick system in accordance with the invention is suitable, in particular, for any helicopter mechanical flight-control device, because it is an additional means which can be associated with a mechanical linkage for controlling the pitch-attitude and/or the roll-attitude of the helicopter. However, it is also suitable for use in association with an electric flight-control system. In the latter case, at least part of said cyclic stick system (with the exception of the cyclic stick itself) may be incorporated into said electric flight-control system.

BRIEF DESCRIPTION OF THE DRAWINGS

The figures of the appended drawing will make it easy to understand how the invention may be realized. In these figures, identical references denote similar elements.

DETAILED DESCRIPTION OF THE PREFERRED EMBODIMENT

Figure 1:
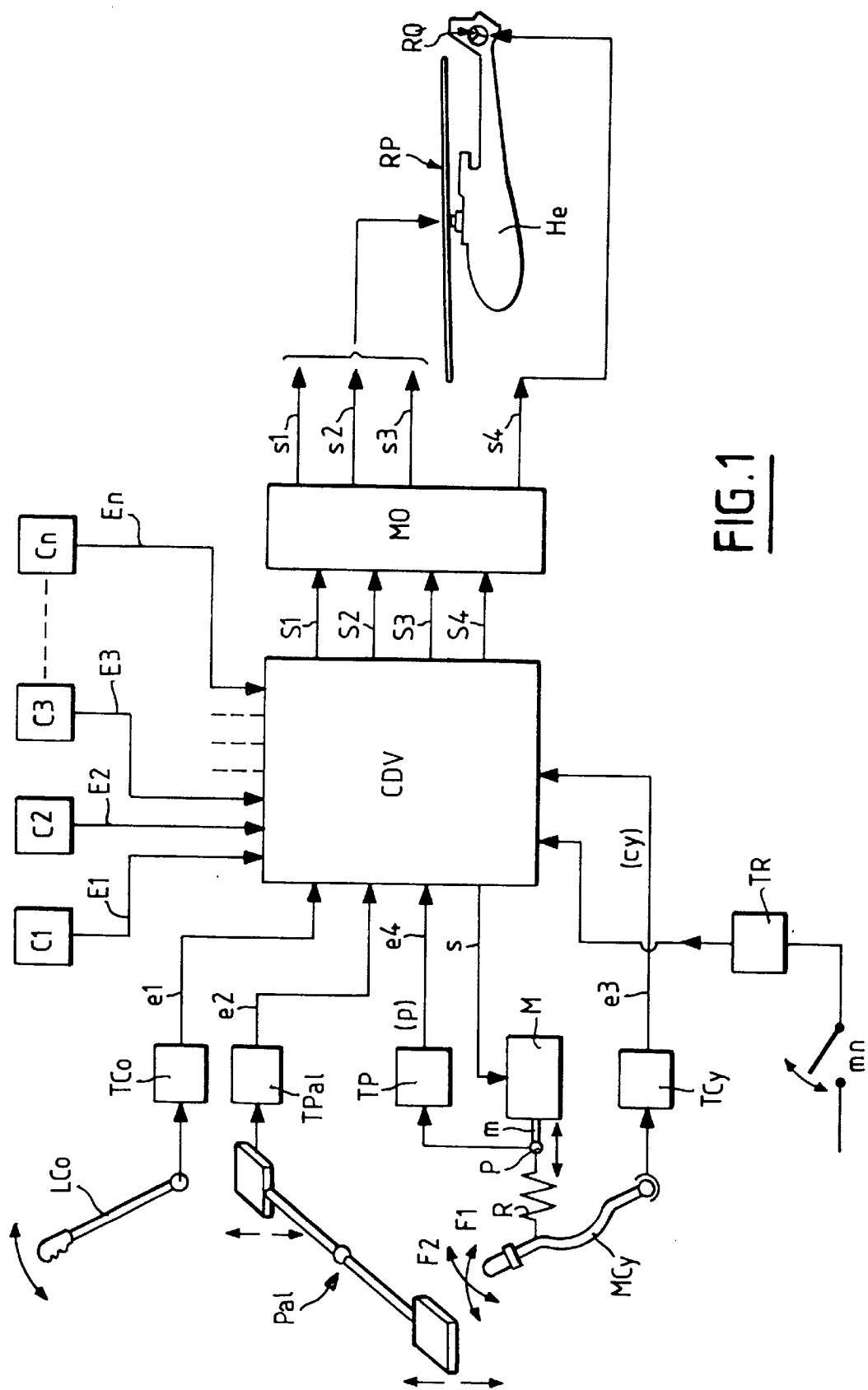
FIG. 1 shows the block diagram of one embodiment for a flight-control system for a helicopter, incorporating a cyclic stick system in accordance with the present invention.
Figure 2:
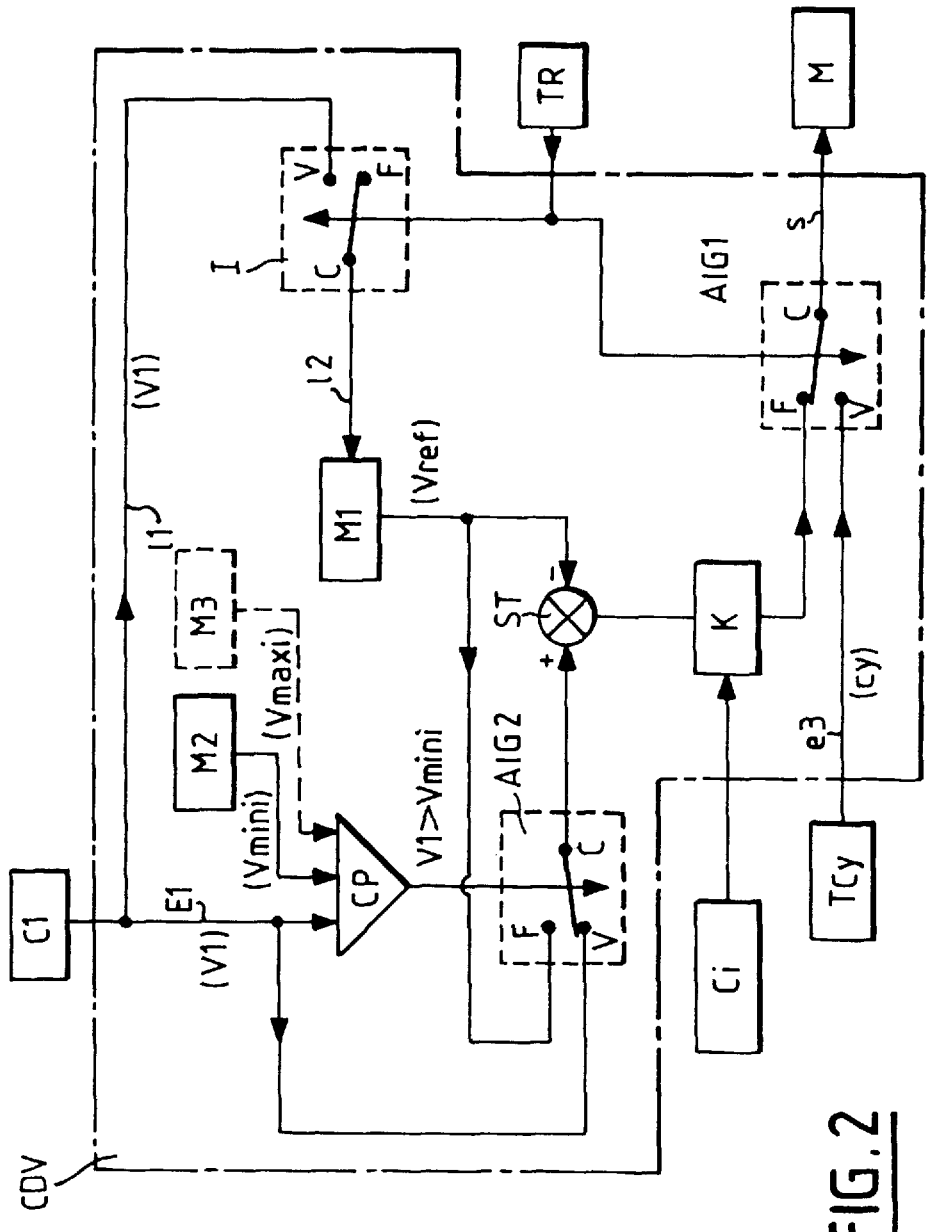
FIG. 2 is the block diagram of an embodiment of the cyclic stick system in accordance with the present invention, intended for pitch-attitude control.

The devices represented schematically in FIGS. 1 and 2 are of course mounted on board a helicopter He to be controlled although for reasons of clarity of the drawing, the helicopter He is represented on a small scale, outside said system, in FIG. 1. The helicopter He includes at least one main rotor RP intended to provide lift, forward travel and pitch- and roll-attitude control as well as a tail rotor RQ or some other device intended to provide lateral equilibrium, and possibly control the yawing of the helicopter He.

The embodiment of flight-control system for a helicopter shown diagrammatically in FIG. 1 includes an electric flight-control device CDV receiving a plurality of information items and transmitting control commands. To this end, in the example represented, associated with the device CDV are:

- the collective pitch lever LCo, associated with a transducer TCo converting the displacements of said lever into an electric signal sent to the device CDV by a link e1;
- the rudder bar Pal, associated with a position sensor TPal converting the positions of said rudder bar into an electric signal sent to the device CDV by a link e2;
- the cyclic pitch stick MCy, associated with a transducer TCy converting the positions of said stick in terms of pitch attitude into an electric signal cy, sent to the device CDV by a link e3. Of course, in the known way, the cyclic pitch stick can be displaced, on the one hand, forward and backward for pitch-attitude control (double-headed arrow F1) and, on the other hand, from left to right and from right to left for roll-attitude control (double-headed arrow F2). However, FIGS. 1 and 2 deal only with pitch-attitude control (double-headed arrow F1). Furthermore, although it is represented in the form of a normal sized stick, it goes without saying that the cyclic stick MCy may be in the form of a mini control column;
- a device for motorizing the cyclic stick MCy for pitch-attitude control, including at least one motor M of any known type (for example of the actuator type) and of any appropriate nature (hydraulic, electric, etc) acting on a moving member m connected to said cyclic stick MCy by a return spring R opposing the action of the pilot on said cyclic stick;
- a position sensor TP converting the positions of the point P to which the return spring R is attached (or anchored) on the moving member m into an electric signal p sent to the device CDV by a link e4;
- a plurality of n sensors C1 to Cn mounted onboard the helicopter He and delivering in the form of electric signals a plurality of information items relating to the status of said helicopter, such as air speed, angular velocities, angular accelerations, attitudes, load factors, etc, said information items being sent to the device CDV by links E1 to En;
- an order combiner MO receiving, via the links S1 to S4, the control commands formulated by the device CDV on the basis of the signals sent by the links e1 to e4 and E1 to En and sending control commands, via the links s1 to s3 to the servocontrols for the main motor RP and, via the link s4, to the servocontrol for the tail rotor RQ;
- a link s (of a nature which is appropriate to the controlling of the motor M, that is to say of the hydraulic, electric, type etc) by which the device CDV sends to the motor M of the cyclic stick MCy commands to shift the moving member m and therefore the attachment or anchorage point P; and
- a device TR for retrimming the cyclic stick MCy, controlled by a lever handle mn available to the pilot and controlling the motor M via the device CDV.

Represented in FIG. 2 is a simple embodiment of the cyclic stick system in accordance with the present invention and consisting in part of the flight control device CDV. Only those links involved in motorizing the cyclic stick MCy in terms of pitch attitude are represented in FIG. 2.

Furthermore, for reasons of clearness of understanding, the embodiment of FIG. 2 is given diagrammatically in the form of an electric circuit but it goes without saying that this is merely a convenient symbolic representation which does not prejudge the actual nature (for example non electric) of each of the devices forming said embodiment. This embodiment, in accordance with the present invention, involves:

- the sensor TCy sensing the pitch-attitude position of the cyclic stick MCy, generating the electric signal cy on the link e3, said signal cy being representative of the positions of the cyclic stick in terms of pitch attitude;
- the sensor C1, generating on the link E1 an electric signal V1 representative of the speed of the helicopter with respect to the air (air speed);
- the device TR for releasing the trim of (cancelling out the forces on) the cyclic stick MCy;
- a sensor C1 representative of any one or more of the sensors C1 to Cn; and
- the motor M for motorizing the cyclic stick MCy.

Moreover, the part in question of said flight-control device CDV includes:

- a first two-way router AIG1, which is controlled by said trim-release device TR and the working input V and quiescent input F of which are connected respectively to said pitch-attitude position sensor TCy and to the output of a gain generator K. The output C from said first router AIG1 is connected to the motor M by the link s;
- first memory means M1;
- a controllable switch I which is controlled by said trim-release device TR and the working input V of which is connected to the output of the sensor C1 by the link 11. The quiescent input F of said switch I is in the air and the output C thereof is connected to said first memory means M1 by a link 12;

second memory means M2 in which is recorded the minimum value Vmin of the air speed V1 above which the helicopter He has unsatisfactory longitudinal (p_tch-attitude) static stability;

a comparator CP receiving from the sensor C1 the current value V1 of the air speed and comparing it with the value Vmin;

a second two-way router AIG2 which is controlled by the comparator CP and the working input V and quiescent input F of which are connected respectively to the outputs of said sensor C1 and of said first memory means M1;

a subtractor ST connected to the output C of said second router AIG2 and to the output of said first memory means M1; and the gain generator K which is connected to the output of said subtractor ST and the gain k of which is possibly controlled by the sensor or sensors C2.

In the device of FIG. 2:

the first router AIG1 is brought into the working position, in which it connects the pitch-attitude position sensor TCy to the motor M, when the pilot actuates the trim-release device TR, by means of the lever handle mn;

the controllable switch I is brought into the working position, in which it connects the sensor C1 to said first memory means M1 via the links 11 and 12, when the pilot actuates the trim-release device TR, by means of the lever handle mn; and the second router AIG2 is brought by the comparator CP into the working position, in which it connects said sensor C1 to the subtractor ST, when the current value V1 is above the minimum value Vmin.

Thus, as is described below, in the air speed domain in which the helicopter has unsatisfactory longitudinal static stability (that is to say if V1 is above Vmin so that the subtractor ST receives the current value V1), the air speed signal V1 can be used to shift the anchorage point P for the forces to a value proportional to the discrepancy between the air speed V1 and a reference air speed k.(V1-Vref), and in a direction such that the anchorage point P moves back as V1 increases. This generates a speed-stabilizing effect which, through a suitable choice of the value of the gain k compensates for the harmful effects of the static longitudinal instability or insufficient stability.

Such a reference value Vref is obtained by recording beforehand, in the first memory means M1, the value of the air speed V1 at a moment prior to which the pilot actuates the trim-release device TR.

From a position of equilibrium in which the cyclic stick MCy is free, the system shifts the anchorage point P and therefore drives said stick, because the pilot's hand is exerting no force on the grip. This results in pitch-attitude cyclic pitch commands which counter the speed-drift tendencies characteristic of statically unstable helicopters and restore stable behavior with a tendency to return to the steady speed. This tendency to return takes place by means of phugoid oscillations in speed and in altitude.

When the pilot acts on the stick MCy to change to a new steady speed, for example a higher one, the reaction of the system to the increase in speed shifts the anchorage point P for the forces backward. The result of this so far as the pilot is concerned is that he needs to maintain a pushing force throughout the maneuver, this being the case despite the fact that the position of the stick has moved back as a result of natural static instability. This results in a tactile sensation which is similar to that obtained with a naturally stable craft, with a comparable workload. In particular, there is no longer a reversal in the direction of forces applied between short-term actions and long-term actions. When the new steady speed is reached, the pilot cancels the forces (retrims) using the device TR, as with any conventional artificial-force system. This cancellation of the forces also leads to the resetting (resynchronizing) of the reference value Vref of the speed stored in the memory M1.

As soon as the anchorage point P is shifted deliberately by the pilot, the previous flying law is inhibited (because the first router AIG1 is in the working position and feeds the motor M with the signal Cy) and Vref is updated to the current value of V1 thanks to the switch I which is then in the working position. As soon as the manual retrimming action is over, Vref keeps its value as the law becomes active again.

When the helicopter He is not in its unstable domain, the second router AIG2 is in the quiescent position and the subtractor ST receives the value Vref at its two inputs. The signal at the output of the comparator CP is therefore nil, and the anchorage point P is immobile.

In the foregoing explanation, it was assumed that the motor M received either the electric signal cy, or the electric signal k.(V1-Vref) via the link s. Of course when the motor M is not of an electric nature (but for example of hydraulic nature) then means (not represented) are provided, for example on the link s for converting said electric signals cy and k.(V1-Vref) into control commands the nature of which is appropriate for the controlling of said motor M.

Furthermore, instead of forming the linear signal k.(V1-Vref) with the aid of subtractor ST and of the gain generator K, it is possible to use any known means to generate a non-linear signal, for example one of the type k.$(V1-Vref)^\alpha$, ($\alpha$=constant).

It will further be noted that the gain k can be made variable as a function of the air speed V1 or of other parameters C1, so as to adapt the flying law as a function of type of flight. Thus, for example, the law can be inhibited for types of flights in which it is unnecessary (for example flying domains in which the static stability is naturally positive).

It may thus be seen that by virtue of the present invention the artificial forces system M, m, R is controlled automatically to compensate for the harmful effects of unsatisfactory longitudinial static instability, in particular:

to restore longitudinal speed stability when the pilot is not acting on the stick;

to make the pilot, when he acts on the controls from a condition of equilibrium with trim released, feel a longitudinal force on the stick MCy which is representative of the speed discrepancies as compared to the initial steady speed, and such that:

acquiring and stabilizing a speed higher than the initial steady speed requires a pushing force;

acquiring and stabilizing a speed which is lower than the initial steady speed requires a pulling force.

When it is desired to provide the helicopter He with longitudinal static stability in a range of values of said parameter V1 representative of the air speed, there are additionally provided third memory means M3 in which is recorded the maximum value Vmax of air speed V1 providing the top limit to said range of values, said third memory means M3 being, like the second, connected to said comparator CP. In the comparator CP, the current value V1 of the air speed is compared both with the value Vmin and with the value Vmax and the second router AIG2 is brought by the comparator CP into the working position, in which it connects the sensor C1 to the subtractor ST, when the current value V1 is higher than the value Vmin and lower than the value Vmax. The second router AIG2 is in the quiescent position, in which it connects the first memory means M1 to the subtractor ST, when said current value V1 is below or equal to said minimum value Vmin or above or equal to said maximum value Vmax.

Thus it will be readily understood from the foregoing that the first router AIG1, controlled by the trim-release device TR, sends to the motorizing means M:

the control command cv representative of the positions of the cyclic stick MCy for pitch-attitude control at the moments when the pilot is actuating the trim-release device TR; or alternatively outside of the moments when the pilot is actuating the trim-release device tR:

either a nil control order (AIG2 in the quiescent position) when the current value of the parameter V1 is below or equal to the minimum value Vmin, or alternatively still when said current value of the parameter V1 is equal to or above said maximum value Vmax;

or a control command which is a function of the difference between the current value of the parameter V1 and the recorded value Vref (AIG2 in the working position as represented in FIG. 2) when said current value of the parameter V1 lies between the minimum value Vmin and the maximum value Vmax.

We claim:

1. A cyclic stick system for an aircraft, the aircraft comprising means for continuously delivering parameters which are representative of a current flight status of said aircraft, at least one of said parameters being representative of an air speed V1 of said aircraft with respect to air, said system comprising:

a cyclic stick for being shifted by a pilot in at least a direction corresponding to pitch-attitude control of said aircraft;

elastic means for returning said cyclic stick by exerting an action which opposes an action exerted by said pilot on said cyclic stick in said direction for said pitch-attitude control;

a moving member to which the elastic means is attached at an attachment point;

motor means for shifting the moving member;

trim-release means for being actuated by the pilot to cause the action exerted on said cyclic stick by said elastic means to be canceled out;

first memory means for recording a value Vref of said parameter V1 representative of said air speed at moments when said pilot actuates said trim-release means; and first routing means, controlled by said trim-release means, for sending to said motor means:

(i) a control command which is representative of positions of said cyclic stick for pitch-attitude control at the moments when said pilot actuates said trim-release means; or alternatively (ii) outside of the moments when the pilot actuates said trim-release means, either (a) a nil control command, when a current value of said parameter V1 representative of the air speed is below or equal to a minimum value Vmin above which said aircraft has unsatisfactory static longitudinal stability; or (b) a control command which is a function of a difference between said current value of said parameter V1 representative of the air speed and said recorded value Vref, when the current value of said parameter V1 representative of the air speed is above said minimum value Vmin.

2. The cyclic stick system as claimed in claim 1, wherein outside of the moments when the pilot actuates said trim-release means, said first routing means send to said motor means:

(i) said nil control command, when the current value of said parameter V1 representative of the air speed is:
  (a) a below or equal to said minimum value Vmin; or
  (b) equal to or above a predetermined maximum value Vmax; or (ii) said control command which is said function of said difference between said current value of said parameter V1 and said recorded value Vref when said current value of said parameter V1 representative of the air speed lies between said minimum and maximum values Vmin and Vmax.

3. The cyclic stick system as claimed in claim 2, further comprising third memory means for recording said predetermined maximum value Vmax, and wherein said comparison means additionally continuously compare the current value of said parameter V1 representative of said air speed with said maximum value Vmax.

4. The cyclic stick system as claimed in claim 1, wherein said function of the difference between said current value of the parameter V1 and the recorded value Vref is linear.

5. The cyclic stick system as claimed in claim 1, wherein said function of the difference between said current value of the parameter V1 and the recorded value Vref is nonlinear.

6. The cyclic stick system as claimed in claim 1, wherein said first memory means is connected to the means for continuously delivering the parameter V1 representative of said air speed by means of a switching means which is normally open and which is made to close by said trim-release means when said trim-release means is actuated by the pilot.

7. The cyclic stick system as claimed in claim 1, further comprising:

second memory means for recording said minimum value Vmin;

comparison means for continuously comparing the current value of said parameter V1 representative of said air speed with said minimum speed Vmin;

second routing means, controlled by said comparison means, for outputting as an output either (i) said parameter V1 when the current value of said parameter V1 is above said minimum value Vmin, or (ii) said value Vref recorded in said first memory means when the current value of said parameter V1 is below or equal to said minimum value Vmin; and subtraction means, connected to the output of said second routing means and said first memory means (M1), for forming a difference between the output of said second routing means and said value Vref and for supplying said difference to said first routing means.

8. The cyclic stick system as claimed in claim 7, further comprising a gain generator connected in series between said subtraction means and said first routing means.

9. The cyclic stick system as claimed in claim 8, wherein said gain generator has a constant gain.

10. The cyclic stick system as claimed in claim 8, wherein said gain generator has a gain which depends on at least one of said parameters which are representative of the current flight status of said aircraft.

11. The cyclic stick system as claimed in claim 1, wherein the aircraft is a helicopter.

* * * * *